United States Patent
Sun et al.

(10) Patent No.: US 6,554,483 B1
(45) Date of Patent: Apr. 29, 2003

(54) METHOD AND APPARATUS OF CROSS-CONNECTING OPTICAL FIBERS

(75) Inventors: Maurice X. Sun, Westmont, IL (US); Sammy Ali, Lisle, IL (US); Thomas R. Marrapode, Naperville, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/977,620

(22) Filed: Oct. 15, 2001

(51) Int. Cl.[7] .................................................. G02B 6/36
(52) U.S. Cl. ............................. 385/59; 385/71; 385/80; 385/114; 385/120; 385/137
(58) Field of Search .............................. 385/59, 65, 71, 385/80, 83, 46, 49, 50, 114, 115, 120, 121, 137

(56) References Cited

U.S. PATENT DOCUMENTS

| | | | | |
|---|---|---|---|---|
| 6,224,269 B1 | * | 5/2001 | Engstrand et al. | ............ 385/59 |
| 6,464,404 B1 | * | 10/2002 | Robinson et al. | ............ 385/54 |
| 2003/0016925 A1 | * | 1/2003 | Sun et al. | .................. 385/115 |

\* cited by examiner

*Primary Examiner*—Hemang Sanghavi
(74) *Attorney, Agent, or Firm*—A. A. Tirva

(57) ABSTRACT

A method and apparatus are provided for cross-connecting the individual optical fibers of a plurality of fiber optic ribbons. A plurality of individual optical fibers are routed onto a substrate to form at least one first optical ribbon. The individual fibers are reorganized on the substrate to form a plurality of second fiber optic ribbons. A plurality of individual dummy optical fibers are routed onto the substrate to increase the number of individual optical fibers of the second fiber optic ribbons without including the dummy optical fibers in the at least one first fiber optic ribbon.

23 Claims, 5 Drawing Sheets

METHOD AND APPARATUS OF CROSS-CONNECTING OPTICAL FIBERS

FIELD OF THE INVENTION

This invention generally relates to the art of optical fibers and, particularly, to a method and apparatus for cross-connecting the individual optical fibers of a plurality of fiber optic ribbons.

BACKGROUND OF THE INVENTION

Fiber optic circuitry is increasingly being used in electronics systems where circuit density is ever-increasing and is difficult to provide with known electrically wired circuitry. An optical fiber circuit is formed by a plurality of optical fibers carried by a dielectric, and the ends of the fibers are interconnected to various forms of connectors or other optical transmission devices. A fiber optic circuit may range from a simple cable which includes a plurality of optical fibers surrounded by an outer cladding or tubular dielectric to a more sophisticated optical backplane or flat fiber optic circuit formed by a plurality of optical fibers mounted on a substrate in a given pattern or circuit geometry.

One type of optical fiber circuit is produced in a ribbonized configuration wherein a row of optical fibers are disposed in a side-by-side parallel array and coated with a matrix to hold the fibers in the ribbonized configuration. In the United States, a twelve-fiber ribbon or an eight-fiber ribbon have become fairly standard. In other foreign countries, the standard may range from as a low as four to as high as twenty-four fibers per ribbon. Multi-fiber ribbons and connectors have a wide range of applications in fiber optic communication systems. For instance, optical splitters, optical switches, routers, combiners and other systems have input fiber optic ribbons and output fiber optic ribbons.

With various applications such as those described above, the individual optical fibers of input fiber optic ribbons and output fiber optic ribbons are cross-connected or reorganized whereby the individual optical fibers of a single input ribbon may be separated and reorganized into multiple or different output ribbons. The individual optical fibers are cross-connected or reorganized in what has been called a "mixing zone" between the input and output ribbons. The resulting cross-connected input and output ribbons may be terminated to a plurality of fiber optic connectors having ferrules and other fiber-holding components, and the connectors, themselves, are fabricated according to given standards or specifications, e.g., eight-fiber connectors or twelve-fiber connectors. When there are different numbers of input ribbons then there are output ribbons, various problems are created in the connectors, because the connectors are designed to hold and terminate a specific number of fibers. In other words, it would be extremely expensive to maintain an inventory of connectors to accommodate fiber optic ribbons having many different numbers of fibers.

For instance, if a given specification or application requires a single eight-fiber input ribbon and four two-fiber output ribbons, the eight fibers of the single input ribbon must be separated, reorganized and cross-connected so that two fibers from the input ribbon are included in each of the four output ribbons. If it is desirable to use standard eight-fiber connectors in this application, it can be understood that the output connectors terminated to each output ribbon will terminate only two fibers. That means that each eight-fiber connector will have six voids in its ferrule or other fiber holding component. This can create serious problems in actual applications, because in a particular overall circuit scheme it is desirable for the fibers of fiber optic ribbons to be maintained in a given sequence, and it is particularly important that the output fibers be maintained in a given sequence or location emanating from a connector. If an eight-fiber connector terminates only two fibers, six voids remain in the connector which makes it difficult for an operator to properly identify fiber locations. The present invention is directed to solving these problems and to various improvements in the concept of cross-connecting or reorganizing a plurality of fiber optic ribbons.

SUMMARY OF THE INVENTION

An object, therefore, of the invention is to provide a new and improved method and apparatus for cross-connecting the individual optical fibers of a plurality of fiber optic ribbons.

In the exemplary embodiment of the invention, a substrate is provided and may have an adhesive thereon to which optical fibers can adhere. A plurality of individual optical fibers are routed onto the substrate to form a plurality of fiber optic input ribbons. The fibers of the input ribbons are reorganized on the substrate to form a plurality of fiber optic output ribbons greater in number than the input ribbons but with lesser number of individual optical fibers than the input ribbons. A plurality of individual dummy optical fibers are routed onto the substrate to increase the number of individual optical fibers of the output ribbons without including the dummy optical fibers in the input ribbons.

It should be understood herein that the terms "input" and "output" are used herein to provide a clear and concise understanding of the invention and, in actual practice, but the number of input ribbons may be greater than the number of output ribbons, but similarly resulting in a discrepancy in the number of fibers between the respective input or output ribbons.

With that understanding, in one embodiment of the invention, at least some of the dummy optical fibers of the output ribbons terminate on the substrate in dead ends. In another embodiment of the invention, at least some of the dummy optical fibers are routed between at least a pair of the output ribbons whereby the dummy optical fibers comprise the fibers of more than one output ribbon.

The input and output ribbons may be coated on the substrate. As disclosed herein, at least some of the input and output ribbons extend beyond a peripheral edge of the substrate. A coating may be applied to the ribbons which extend beyond the edge of the substrate to hold the individual fibers of the ribbons in ribbon form. The extended ribbons may be terminated to a plurality of fiber optic connectors outside the substrate to form an optical fiber cross-connected harness.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
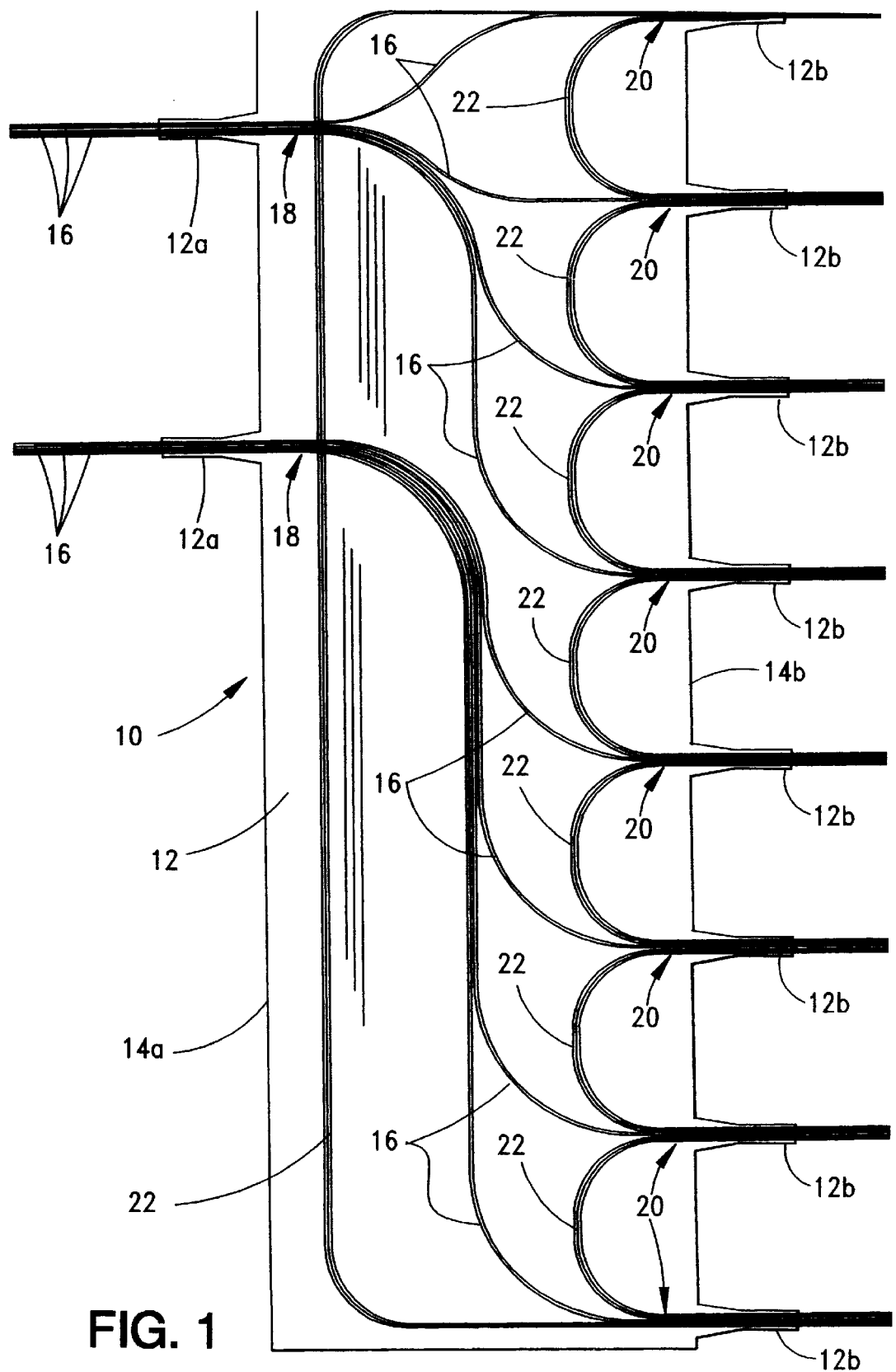
FIG. 1 is a plan view of one embodiment of a cross-connecting apparatus fabricated according the method of the invention.
Figure 2:
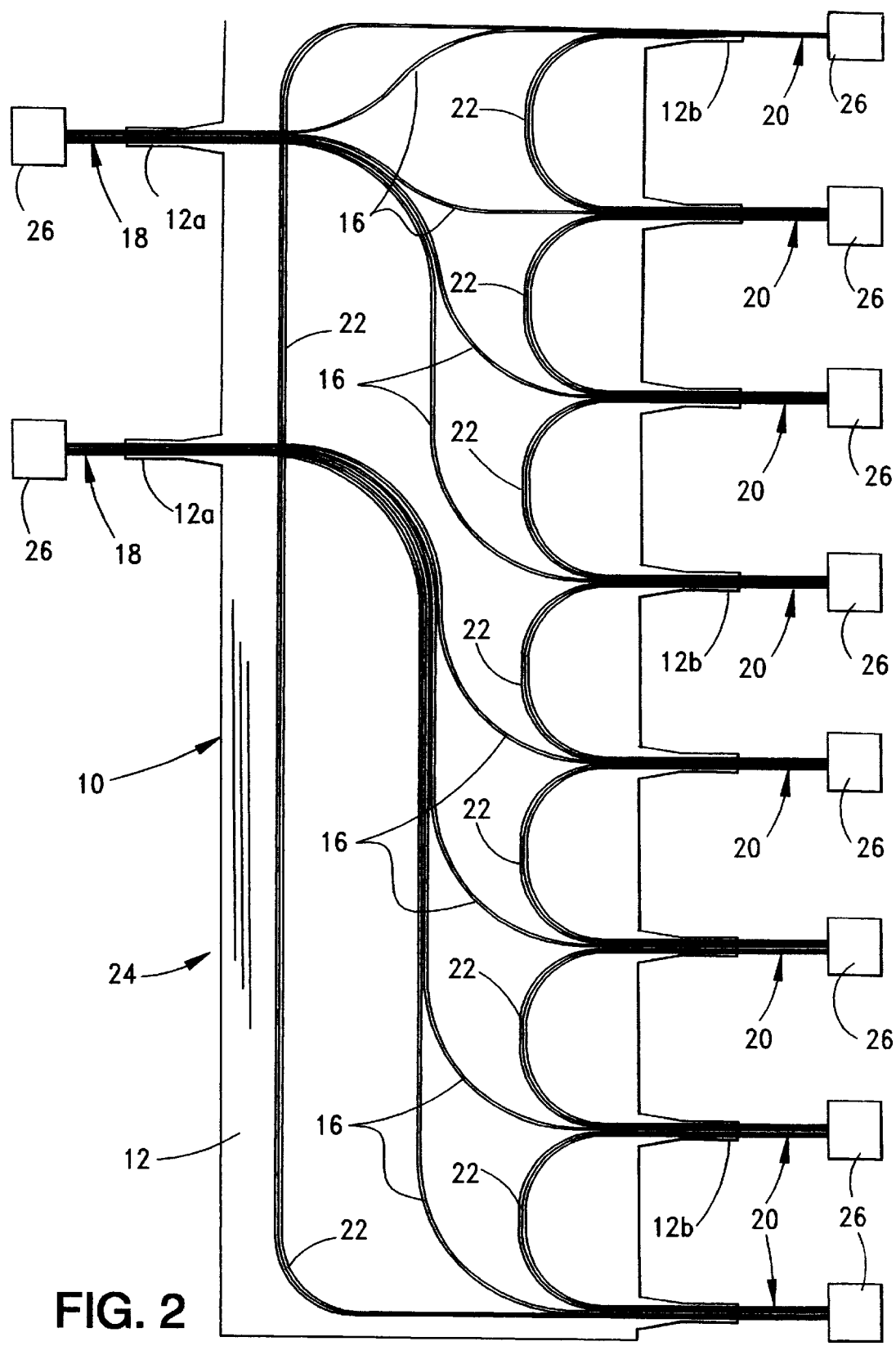
FIG. 2 is a view similar to that of FIG. 1, with the fiber optic ribbons terminated to a plurality of connectors to form an optical fiber harness.
Figure 3:
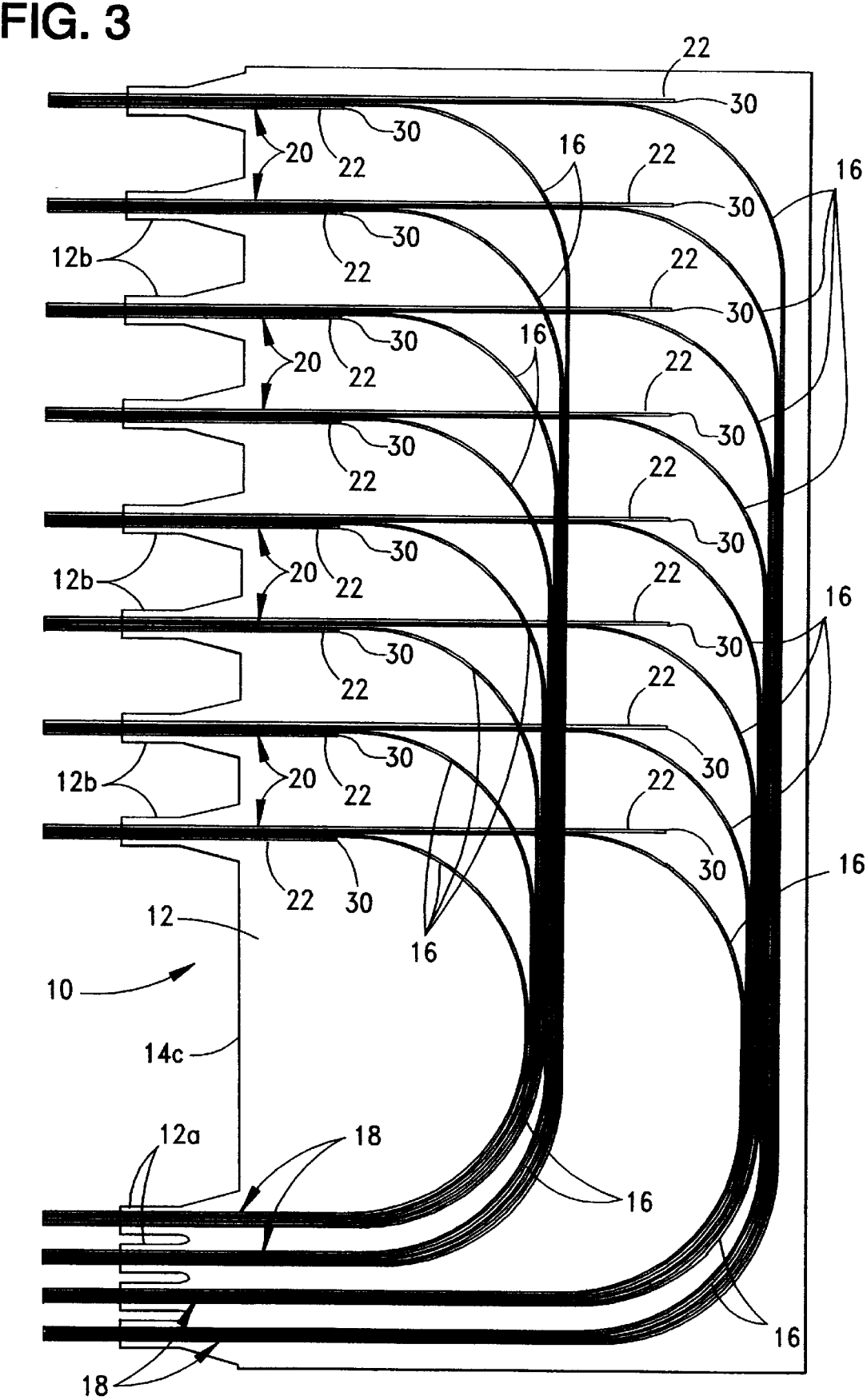
FIG. 3 is a view similar to that of FIG. 1, but of a second embodiment of the invention.
Figure 4:
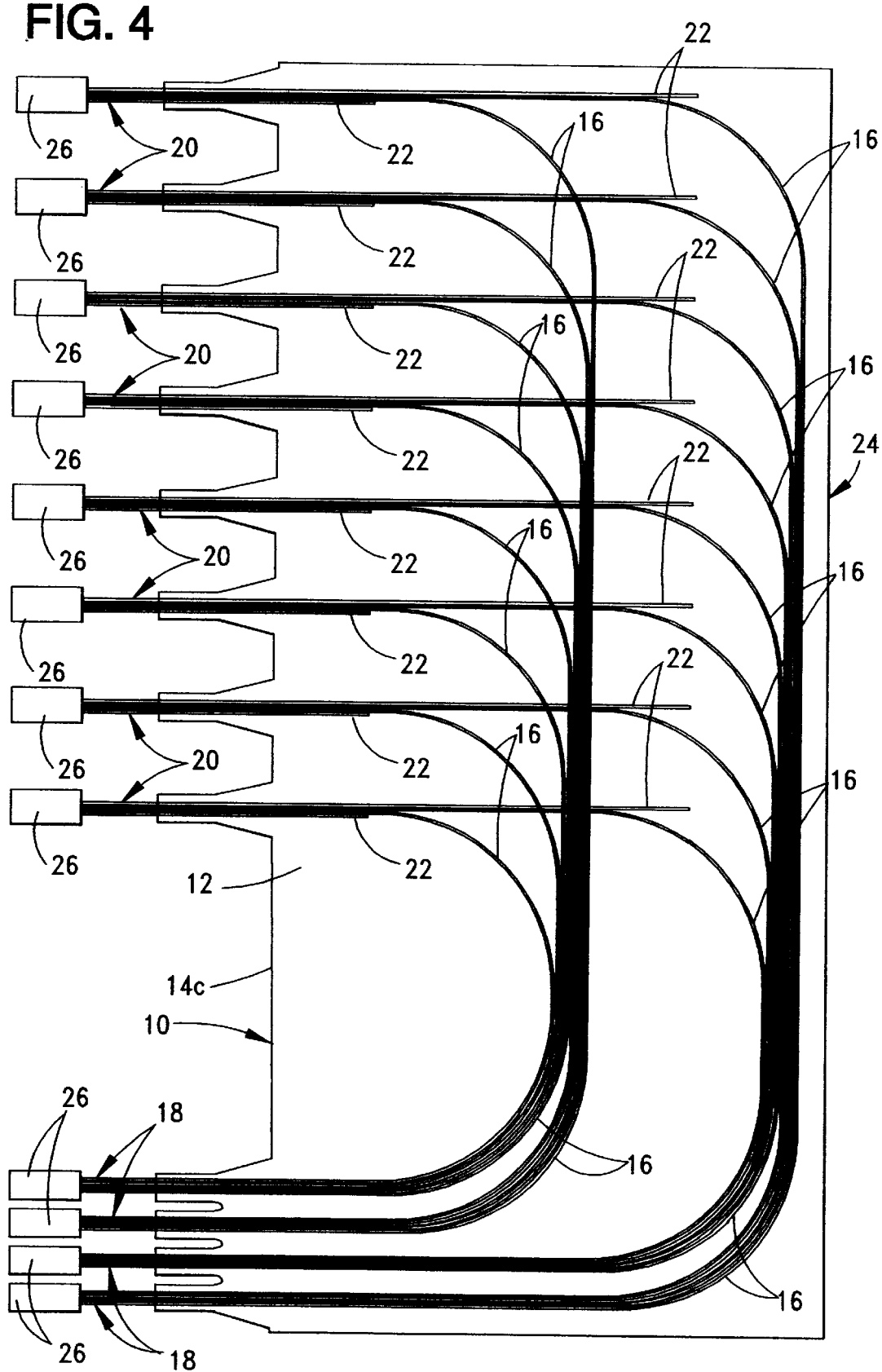
FIG. 4 is a plan view of an optical fiber harness using the cross-connecting apparatus of FIG. 3.

Referring to the drawings in greater detail, FIGS. 1 and 2 show a first embodiment of a cross-connecting apparatus according to the method of the invention, and FIGS. 3 and 4 show a second embodiment of a cross-connecting apparatus according to the method of the invention. Both apparatus and methods are similar except for the routing of the dummy optical fibers (described hereinafter) at the output ribbons of the apparatus.

With that understanding, FIG. 1 shows a cross-connecting apparatus, generally designated 10, which includes a substrate 12 which may be a flexible sheet of polymer material. The substrate has a pair of input tails 12a and eight output tails 12b, with the input tails projecting outwardly of an edge 14a of substrate 12 and the output tails projecting outwardly of an opposite edge 14b of the substrate. Preferably, the substrate has an adhesive thereon so that individual optical fibers will adhere thereto.

A plurality of individual optical fibers 16 are routed onto substrate 12 to form a pair of fiber optic input ribbons, generally designated 18. Fibers 16 are separated, reorganized and cross-connected on substrate 12 to form eight fiber optic output ribbons, generally designated 20. Input ribbons 18 are eight-fiber ribbons. Therefore, it can be understood that with only two input ribbons, two individual optical fibers 16 are routed from each input ribbon 18 to each of four different output ribbons 20.

However, it is desirable that the output ribbons be comprised of a standard number of individual optical fibers for termination to standard fiber optic connectors, such as an eight-fiber connector or a twelve-fiber connector. Since input ribbons 18 are eight-fiber ribbons which will be terminated to eight-fiber connectors, it is highly desirable that output ribbons 20 be terminated to eight-fiber connectors so that the fibers can be maintained in a particular sequence, as discussed in the "Background", above. Without the invention herein, this would be very difficult because only two individual optical fibers 16 are routed from each of the input ribbons to a respective one of the output ribbons. Without the invention, six voids would be created in the output connectors, and this would be highly undesirable.

The invention contemplates routing a plurality of individual dummy optical fibers 22 onto substrate 12 to increase the number of individual optical fibers of output ribbons 20 without including dummy optical fibers 22 in input ribbons 18. In the embodiment of FIG. 1, it can be seen that three dummy optical fibers 22 are routed between each adjacent output ribbon 20. In addition, three dummy output fibers 22 are routed between the end-most output ribbons (i.e., the top and bottom output ribbons) as viewed in FIG. 1. Therefore, this routing arrangement supplies a total six dummy optical fibers to each output ribbon 20 which, combined with two individual optical fibers 16 at each output ribbon, results in each output ribbon being formed as a standard eight-fiber ribbon for termination to an eight-fiber connector.

Although pointed out in the "Summary", above, it must be repeated that the terms "input" and "output" are used herein only to provide a clear, concise and better understanding of the invention. Obviously, what ribbon is an "input" or an "output" ribbon simply is determined by the ultimate use of apparatus 10. For instance, fiber optic ribbons 20 may be input ribbons and fiber optic ribbons 18 may be output ribbons in FIG. 1, resulting in more input ribbons than output ribbons. Yet, the concepts of the invention are equally applicable regardless of the particular use of apparatus 10. In addition, individual optical fibers 16 and dummy optical fibers 22 can be routed onto substrate 12 by a variety of means ranging from manual routing to automated or mechanical routing. For instance, details of a mechanical routing apparatus can be derived from copending application Ser. No. 09/645,624, filed Aug. 24, 2000, assigned to the assignee of the present invention, and which is incorporated herein by reference.

FIG. 2 simply shows how apparatus 10 (FIG. 1) can be used in an optical fiber harness, generally designated 24. The harness simply includes a plurality of fiber optic connectors 26 terminated to input ribbons 18 and output ribbons 20. To that end, it is contemplated that a coating be applied over fibers 16 and 22 which have been routed onto substrate 12 and input and output tails 12a and 12b, respectively, with the fibers adhering to the substrate. In addition, a coating preferably is applied to ribbons 18 and 20 which extend beyond the peripheral edge of the substrate and tails, to hold the individual fibers of the ribbons in ribbon form. Therefore, apparatus 10 can be easily manipulated as a subassembly for subsequent termination to connectors 26 to form optical fiber harness 24.

FIG. 3 shows an alternate or second embodiment of the invention wherein individual optical fibers 16 are routed onto a substrate 12 to form four fiber optic input ribbons 18 and, again, eight fiber optic output ribbons 20. Both the input and output ribbons are routed onto input tails and output tails 12a and 12b, respectively, which project outwardly of a common edge 14c of the substrate. With this routing scheme, two individual fibers 16 from each of the four input ribbons are cross-connected into four of the eight output ribbons 20. In essence, each output ribbon 20, therefore, has four individual optical fibers 16 from input ribbons 18. In order to provide each output ribbon 20 with a full complement of eight fibers, four dummy optical fibers 22 are routed onto substrate 12 and included in each output ribbon. In the embodiment of FIG. 3, it can be seen that output ribbons 22 extend onto substrate 12 to dead ends 30. The result is the same as with the embodiment of FIG. 1, in that all of the input and output ribbons 18 and 20, respectively, are comprised of eight optical fibers.

FIG. 4, like FIG. 2, simply shows an optical fiber harness 24 which is formed by terminating input ribbons 18 and output ribbons 20 to fiber optic connectors 26. All of the connectors can be standard eight-fiber connectors terminated to eight-fiber ribbons because of the addition of dummy optical fibers 22.

Figure 5:
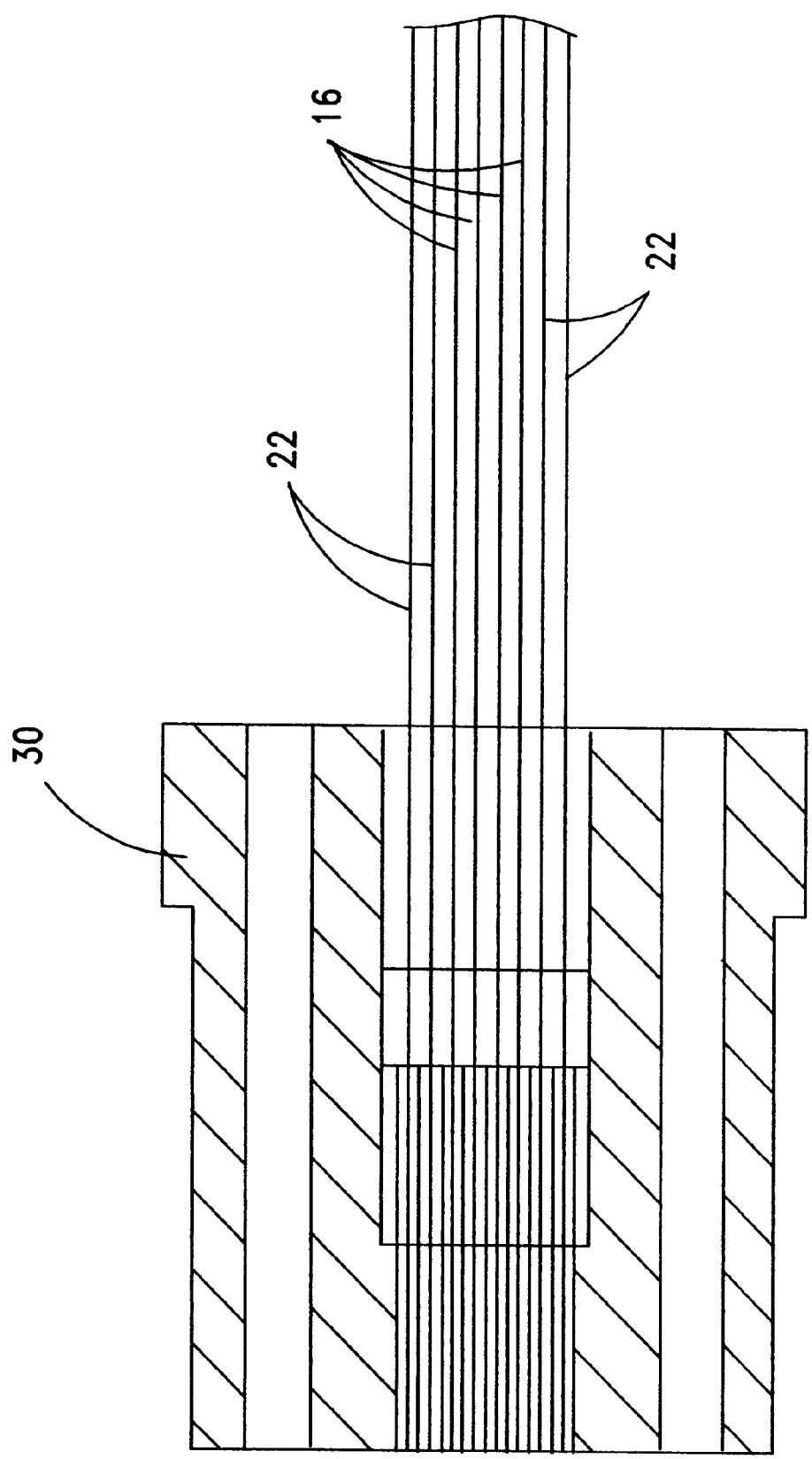
FIG. 5 is an enlarged section through a connecting ferrule which can be terminated to the fiber optic ribbons.

Finally, FIG. 5 shows a typical ferrule 30 which terminates eight fibers and which, according to the embodiment of FIGS. 3 and 4, may include four dummy optical fibers 22 along with four individual optical fibers 16 which have been routed from input ribbons 18. Ferrule 30 may be an interior component of each fiber optic connector 26.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of cross-connecting individual optical fibers of a plurality of fiber optic ribbons, comprising the steps of:

providing a substrate having an adhesive thereon;

routing a plurality of individual optical fibers onto the substrate to form a plurality of fiber optic input ribbons, reorganizing the fibers on the substrate and forming a plurality of fiber optic output ribbons greater in number than the input ribbons but with lesser number of individual optical fibers than the input ribbons; and routing a plurality of individual dummy optical fibers onto the substrate to increase the number of individual optical fibers of the output ribbons without including the dummy optical fibers in the input ribbons.

2. The method of claim 1 wherein at least some of said dummy optical fibers of the output ribbons terminate on the substrate in dead ends.

3. The method of claim 1 wherein at least some of said dummy optical fibers are routed between at least a pair of the output ribbons whereby the dummy optical fibers comprise the fibers of more than one output ribbon.

4. The method of claim 1, including coating the input and output ribbons on the substrate.

5. The method of claim 1 wherein at least some of the input and output ribbons are extended beyond a peripheral edge of the substrate.

6. The method of claim 5, including coating said at least some of the input and output ribbons extending beyond the peripheral edge of the substrate to hold the individual fibers of the ribbons in ribbon form.

7. The method of claim 1 wherein the number of individual optical fibers in each input ribbon is the same and equal to the number of individual optical fibers, including dummy optical fibers, in each output ribbon.

8. The method of claim 1, including terminating said input and output ribbons to a plurality of fiber optic connectors outside said substrate.

9. A method of cross-connecting individual optical fibers of a plurality of fiber optic ribbons, comprising the steps of:

providing a substrate;

routing a plurality of individual optical fibers onto the substrate to form at least one first fiber optic ribbon, reorganizing the fibers on the substrate and forming a plurality of second fiber optic ribbons greater in number than the at least one first ribbons but with lesser number of individual optical fibers than the at least one first ribbon; and routing a plurality of individual dummy optical fibers onto the substrate to increase the number of individual optical fibers of the second fiber optic ribbons without including the dummy optical fibers in the at least one first fiber optic ribbon.

10. The method of claim 9 wherein at least some of said dummy optical fibers of the second ribbons terminate on the substrate in dead ends.

11. The method of claim 9 wherein at least some of said dummy optical fibers are routed between at least a pair of the second ribbons whereby the dummy optical fibers comprise the fibers of more than one second ribbon.

12. The method of claim 9, including coating the first and second ribbons on the substrate.

13. The method of claim 9 wherein at least some of the first and second ribbons are extended beyond a peripheral edge of the substrate.

14. The method of claim 13, including coating said at least some of the first and second ribbons extending beyond the peripheral edge of the substrate to hold the individual fibers of the ribbons in ribbon form.

15. The method of claim 8, including terminating said first and second ribbons to a plurality of fiber optic connectors outside said substrate.

16. A fiber optic apparatus for cross-connecting individual fibers of a plurality of fiber optic ribbons, comprising:

a substrate;

a plurality of individual optical fibers on the substrate forming at least one first fiber optic ribbon, the fibers being reorganized on the substrate forming a plurality of second fiber optic ribbons; and a plurality of individual dummy optical fibers on the substrate to increase the number of individual optical fibers of the second fiber optic ribbons without including the dummy optical fibers in the at least one fiber optic ribbon.

17. The fiber optical apparatus of claim 16 wherein at least some of said dummy optical fibers of the second ribbons terminate on the substrate in dead ends.

18. The fiber optical apparatus of claim 16 wherein at least some of said dummy optical fibers are routed between at least a pair of the second ribbons whereby the dummy optical fibers comprise the fibers of more than one second ribbon.

19. The fiber optical apparatus of claim 16, including a coating on the first and second ribbons on the substrate.

20. The fiber optical apparatus of claim 16 wherein at least some of the first and second ribbons extend beyond a peripheral edge of the substrate.

21. The fiber optical apparatus of claim 20, including a coating on at least some of the first and second ribbons extending beyond the peripheral edge of the substrate to hold the individual fibers of the ribbons in ribbon form.

22. The fiber optical apparatus of claim 16, including a plurality of fiber optic connectors terminated to said first and second ribbons outside said substrate.

23. The fiber optical apparatus of claim 16, including an adhesive on the substrate to which the individual optical fibers and the dummy optical fibers are adhered.

* * * * *